(12) United States Patent
Dunham et al.

(10) Patent No.: US 6,793,114 B2
(45) Date of Patent: Sep. 21, 2004

(54) SOLDERING HEATER CARTRIDGE WITH REPLACEABLE TIPS AND SOLDERING IRON FOR USE THEREWITH

(75) Inventors: Paul Alan Dunham, Milton Keynes (GB); William Jordan Siegel, Bethesda, MD (US); Gary Silas Sines, Woodbine, MD (US); John Franklin Wood, New Windsor, MD (US); Jeffrey Alan Snell, Abindgon, MD (US); John Walter, Mt. Airy, MD (US); Charles H. McDavid, Nottingham, MD (US)

(73) Assignee: Pace, Incorporated, Annapolis Junction, MD (US)

( * ) Notice: Subject to any disclaimer, the term of this patent is extended or adjusted under 35 U.S.C. 154(b) by 139 days.

(21) Appl. No.: 10/116,131

(22) Filed: Apr. 5, 2002

(65) Prior Publication Data

US 2003/0189081 A1 Oct. 9, 2003

(51) Int. Cl.$^7$ .............................. B23K 3/08; B23K 3/02; H05B 1/00
(52) U.S. Cl. .................... 228/51; 228/20.5; 228/53; 228/55; 219/227; 219/229; 219/238
(58) Field of Search ........................ 228/50–55, 205; 219/227, 229, 238

(56) References Cited

U.S. PATENT DOCUMENTS

| | | | | |
|---|---|---|---|---|
| 3,592,378 A | * | 7/1971 | Petraglia | 228/51 |
| 3,863,813 A | * | 2/1975 | Metzner | 222/146.3 |
| 4,055,744 A | * | 10/1977 | Fortune | 219/239 |
| 4,358,662 A | * | 11/1982 | Cranor et al. | 219/230 |
| 4,564,563 A | * | 1/1986 | Martin et al. | 428/546 |
| 4,773,582 A | * | 9/1988 | Vella | 228/20.5 |
| 4,839,501 A | | 6/1989 | Cowell | |
| 4,940,178 A | | 7/1990 | Hombrecher | |
| 5,043,560 A | | 8/1991 | Masreliez | |
| 5,143,272 A | * | 9/1992 | Carlomagno et al. | 228/20.5 |
| 5,945,015 A | * | 8/1999 | Feinler | 219/229 |
| 6,019,270 A | | 2/2000 | Boll et al. | |
| 6,039,237 A | | 3/2000 | Nakajima et al. | |
| 6,054,678 A | | 4/2000 | Miyazaki | |
| 6,147,325 A | | 11/2000 | Eisele | |
| 6,513,697 B1 | * | 2/2003 | Sines et al. | 228/51 |
| 2002/0084307 A1 | * | 7/2002 | Ruszowski | 228/51 |

FOREIGN PATENT DOCUMENTS

| | | | |
|---|---|---|---|
| JP | 54-161510 A | * | 12/1979 |
| JP | 2001-121260 A | * | 5/2001 |

* cited by examiner

*Primary Examiner*—L. Edmondson
(74) *Attorney, Agent, or Firm*—Nixon Peabody LLP; David S. Safran

(57) ABSTRACT

A soldering heater cartridge with replaceable tips and a soldering iron for use therewith is constructed of a tip heater cartridge with an elongated cartridge body that has a tubular body member, electrical connectors at a first end of the tubular body member for plug-in connection with an electrical connector assembly of a soldering iron handpiece, a soldering tip for mounting on the cartridge body and a heater mounted within the cartridge body and electrically connected to the electrical connectors. The tip end part is located at a second end of the cartridge body and the heater is located within the tip end part, the soldering tip being replaceably mountable over the tip end part in heat exchange contact with it.

28 Claims, 3 Drawing Sheets

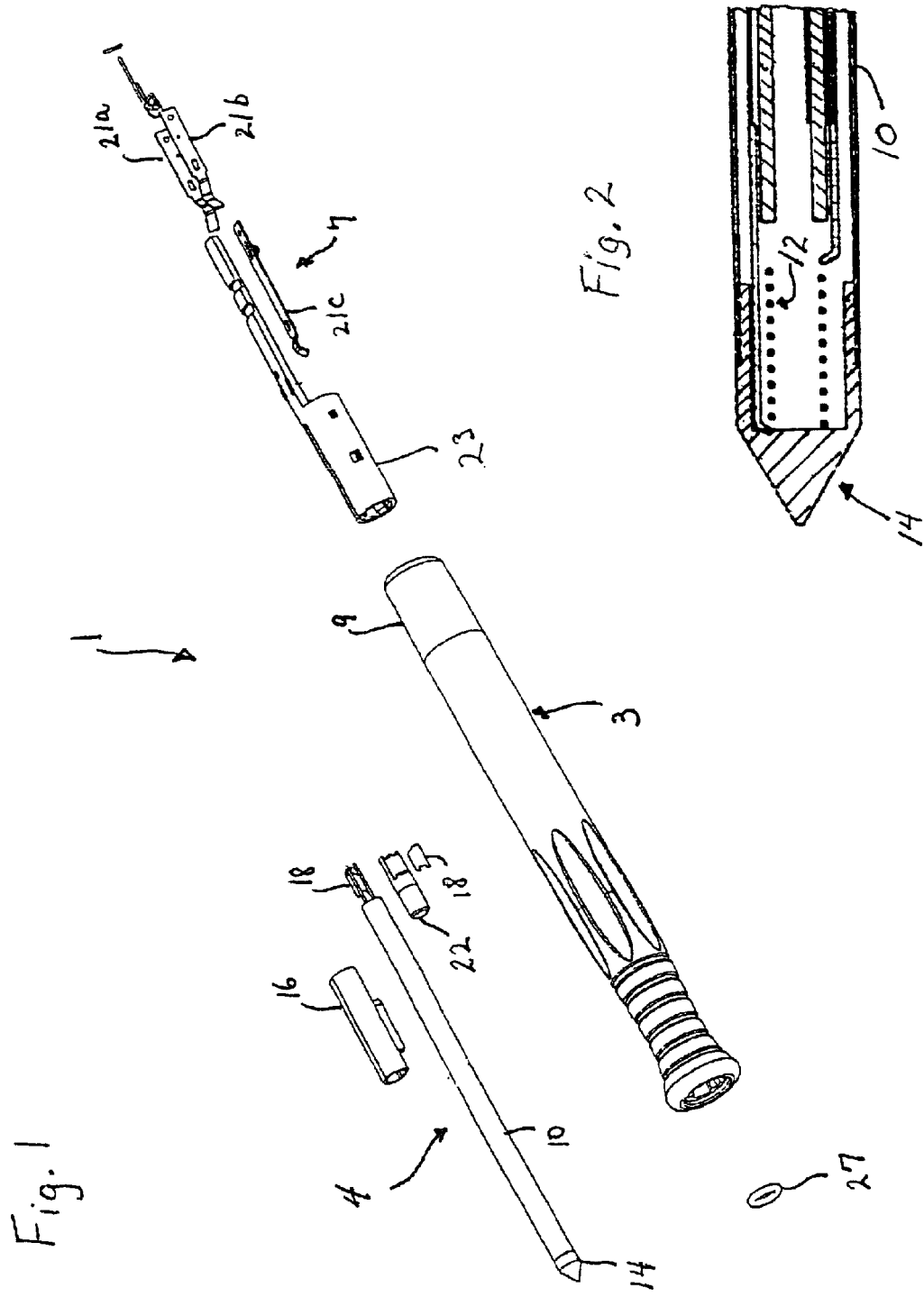

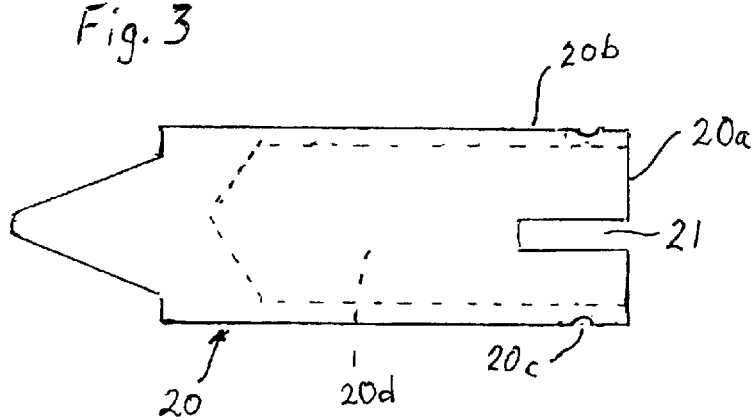
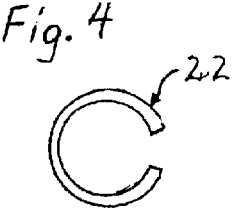
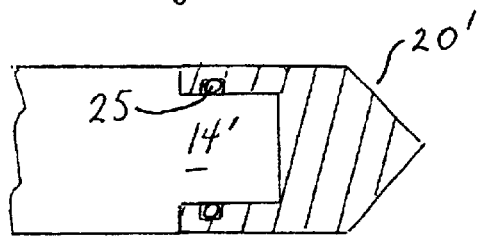
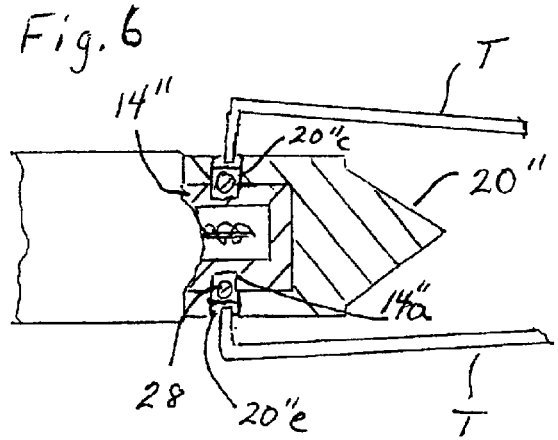
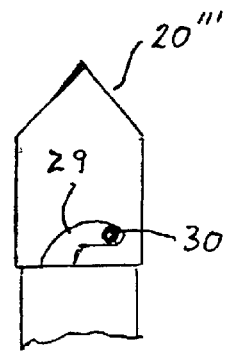

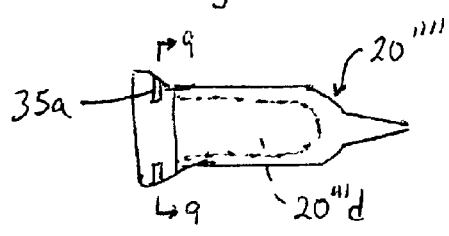
Fig. 8
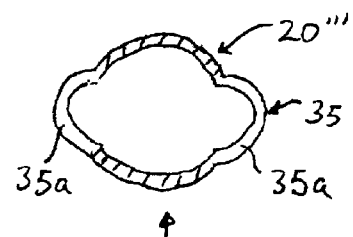
Fig. 9
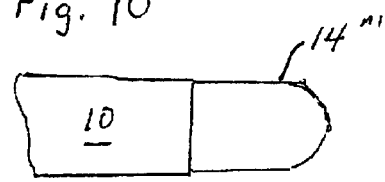
Fig. 10
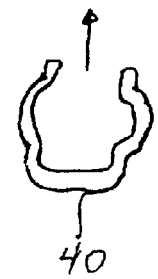
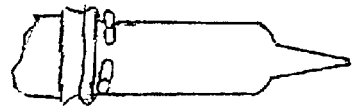
Fig. 11

SOLDERING HEATER CARTRIDGE WITH REPLACEABLE TIPS AND SOLDERING IRON FOR USE THEREWITH

BACKGROUND OF THE INVENTION

1. Field of the Invention

This invention relates generally to soldering irons and soldering stations used in modern electronic production, rework and repair applications which are temperature controlled, and specifically relates more to production type soldering stations which feature a heater which is either replaceable or integral with the soldering handpiece and which utilizes separately replaceable tips which wear during normal use. The invention also relates to such soldering irons and soldering stations which use a combined tip/heater cartridge, and in which the entire tip/heater cartridge is changed when the tip wears out.

2. Description of Related Art

The products the first type mentioned above are produced by WELLER®, PACE®, ANTEX®, ERSA® and HAKKO®; see also, commonly owned, co-pending U.S. patent application Ser. No. 09/973,952. The products of the second type mentioned above include the tip/heater cartridge product of METCAL INCORPORATED, or a combined heater/thermocouple arrangement such as that found in U.S. Pat. No. 5,043,560 (Masreliez) and in the Model 941 soldering station of the Hakko Corporation (Miyazaki U.S. Pat. No. 6,054,678); see also, U.S. Pat. No. 4,839,501 of METCAL® and commonly owned, co-pending U.S. patent application Ser. Nos. 09/972,194 and 10/046,545. Compared with traditional soldering stations, tip/heater cartridge stations generally offer significantly improved heat delivery and responsiveness as well as a slim, lightweight and often cooler handpiece which many operators prefer.

Conventional soldering stations for modern, high-reliability electronic production, rework and repair applications (hereinafter, "soldering stations" shall also include "soldering irons") have become the generally accepted norm due to their ability to maintain a safe, appropriate, user-selected tip operating temperature for the particular application at hand. Such traditional soldering stations generally feature a soldering iron handpiece which consists of a handle and a closed-loop temperature controlled heater onto which a replaceable soldering tip is attached through various means, examples of which include the products made by WELLER®, PACE® ANTEX®, ERSA® and HAKKO®. These tip attachment means include a variety of configurations which are well known to the art. One configuration is a hollow heater into which tips are installed and fastened with set screws. Another configuration includes a thin cylindrical heater over which a hollow tip is installed and held in place by a shroud which fits over a shoulder on the tip and is fastened to the handpiece with a nut. Still another tip attachment means includes a thin, cylindrical heater with a stainless steel shroud over which a hollow tip is installed and held fast by some spring means which includes a separate spring ring, a spit in the open end of the tip that fits over the shroud, a combination of these two features or an independent coil spring with one end attached to the handpiece and the other end formed in a small hook shape which when stretched slightly engages a hole in the side of the tip thereby holding it in place.

Most of these conventional soldering stations offer adequate thermal performance, operator comfort and ease of use for older electronic assemblies. In addition, they provide relatively economical operation in that the replaceable tips are generally in the $4.00 to $8.00 dollar range in cost and the heaters need replacement only occasionally. However, when their heaters need replacement, they can be quite costly upwards of $75 dollars each or more and/or can be very time consuming or difficult to replace, often requiring soldering or desoldering. However, some soldering irons feature easily replaceable heaters, such as the PACE PS-80/90 handpieces; but, the cost of heater replacement is still relatively high. Furthermore, with other conventional soldering irons, the heater is not replaceable at all (ANTEX and WELLER SILVER SERIES), so that the entire handpiece must be replaced, sometimes costing upwards of $125 dollars or more.

In recent years, many of the latest electronic assembly and rework applications have very high thermal mass joints on circuit boards with ground planes, or incorporate a very high degree of miniaturization where access to the electronic components and joints is quite limited. In these situations, conventional soldering irons may not provide sufficient heating capability or responsiveness or their relatively bulky heaters and tips do not allow the operator to easily view and solder smaller joints in hard to reach, tight places. In very high through-put electronic production environments, operator comfort, ease of use and efficiency can also suffer due to the relatively large physical dimensions of the handpiece itself, the relatively long distance between the grip portion of the handpiece and the working end of the soldering tip, and the build-up of heat in the handle due to the proximity of the heater to the grip. In addition, many of these soldering stations feature operator selected temperature control which, in some manufacturing environments with relatively unskilled operators, has become a less desirable feature as the supervisor prefers that the operator solder at one specified temperature.

For all the reasons, tip/heater cartridge stations, with their attendant advantages outlined above have become quite popular, particularly in the large contract manufacturing environments. However, because tip life (either conventional tips or tip/heater cartridges) is limited by several factors, such as tip operating temperature, iron plating thickness, solder flux composition and other factors, these tips must be replaced quite frequently, sometimes as often as once per day depending on usage. While conventional soldering tips are relatively inexpensive as discussed above, replacing of tip/heater cartridges can be quite expensive as these cost anywhere from upwards of $12 to $24 dollars each or more.

SUMMARY OF THE INVENTION

It is therefore a primary object of the present invention to create an easily replaceable tip end which attaches to the end of an easily replaceable heater cartridge such that only the tip end needs to be replaced at a fraction of the cost of replacing a traditional tip/heater cartridge while offering all or most of the advantages of a tip/heater cartridge.

It is another primary object of the present invention to create a soldering iron with an inexpensive, easily replaceable heater cartridge which uses inexpensive, easily replaceable tips.

It is yet another primary object of the present invention to provide an easily replaceable, inexpensive heater cartridge which offers improved heat transfer and responsiveness over conventional soldering irons (such as by providing the heater bobbin with a silvered end portion on which the tip end seats).

A further object of the present invention is to provide an easily replaceable, inexpensive heater cartridge and tip combination which offers improved physical dimensions (such as a short tip-to grip for better control, and a thin heater and tip for easy access and viewing in tight spaces) in addition to improved heat transfer and responsiveness relative to conventional soldering irons.

It is still another object of the present invention to provide an easily replaceable, inexpensive heater cartridge and tip combination which offers improved comfort to the operator by keeping the heat of the handpiece well away from the grip portion thereof.

These and other objects are achieved by the provision of a heater cartridge composed of a stainless steel tube, a ceramic-potted heater assembly contained within a cylinder closed at one end which is either squared off or tapered and made from a high thermal conductivity material, such as silver, and wherein the heating element is connected to a dissimilar metal which forms a thermocouple, also containing cold lead wires of greater cross-sectional area than the heating element, an end insert which supports and fixes electrical contacts, and wire insulation. The heater cartridge accommodates a replaceable tip which slips over the closed end and is retained, e.g., by a spring, clip, internal thread mating to an external thread on the heater, a pin on the heater and track on the tip, interference fit between tip and heater, or other means.

The heater cartridge with slip-on tip offers an economic advantage to its users. The user can have several heater cartridges and slip-on tips so that when a new or alternate tip is required, the heater cartridge with slip-on tip is removed and a cool heater cartridge (with a replacement slip-on tip already attached) is installed into to the iron. The user need not inventory a large number of tip heater cartridges, but instead needs only a few heater cartridges at each station. Inexpensive slip-on tips can be inventoried at substantially lower cost and require less storage space than their costly tip heater cartridge counterparts.

BRIEF DESCRIPTION OF THE DRAWINGS

FIG. 1 is an exploded view of a preferred embodiment soldering iron with a heater cartridge in accordance with the present invention with the soldering tip removed;

FIG. 2 is a cross-sectional view of the front end portion of the FIG. 1 heater cartridge;

FIG. 3 is a side view of a soldering tip for used with the FIG. 1 heater cartridge;

FIG. 4 is a plan view of a spring clip for use with the FIG. 3 soldering tip;

FIGS. 5–7 each show a respective alternative arrangement for mounting and retaining of a soldering tip on the end of a heater cartridge;

FIG. 8 is a side view of another alternative solder tip arrangement for mounting and retaining of a soldering tip on the end of a heater cartridge; and FIG. 9 a cross-section taken along line 9—9 in FIG. 8 with an illustration of a spring clip being slid thereon;

FIG. 10 is a side view of the front end portion of an alternative heater cartridge; and FIG. 11 shows the FIG. 8 soldering tip mounted on the FIG. 10 heater cartridge using a spring clamp.

DETAILED DESCRIPTION OF THE INVENTION

The soldering iron 1 in accordance with the present invention has a handpiece 3 and a heater cartridge 4. The handpiece 3 has an elongated hollow body with an inner passage that is open at an outer end of the passage for receiving the heater cartridge 4. An electrical connector assembly 7 is mounted in an inner end of the passage, being inserted from the opposite direction as the cartridge 4, and then being held in place by an end cap 9 that is screwed onto threads (not shown) of the handpiece 3 and through which an electric power cord (not shown) extends. This constructional feature allows the connector assembly 7 to be removed for maintenance or repair.

The electrical connector assembly 7 may comprise leaf spring connectors 21a, 21b, 21c, which are mounted in a receptacle body 23 which has slots for reception thereof. When the cartridge 4 is plugged into the handpiece 3, the leaf spring connectors 21a, 21b, slide onto the plate-shaped electrical connectors 18 to form an electrical connection with an electrical heater 12 (FIG. 2) located in a tip end part 14 that is mounted at the front end of the tubular body member 10 of the cartridge 4. The leaf spring connector 21c slides onto the tubular body member 10 (which is preferably made of stainless steel) of cartridge 4 to provide a grounding interface connection therewith, as the inner end of the heater cartridge 4 is moved into the tubular portion of the receptacle body 23. While a bent tab of one of the plate-shaped electrical connectors 18 is shown attached to an end of one of the leads of the cartridge heater in FIG. 2, it should be appreciated that this connection is formed after the leads are passed through a cartridge end cap 22 which has surfaces and notches for receiving and supporting plate-shaped connectors 18 and their bent tabs.

An O-ring 27 is mounted at the front end of the receptacle body 23 and is held thereagainst by a formation on an inner surface of the handpiece 3. The O-ring 27 forms a sealed interface with respect to the tubular body member 10 of the heater cartridge 4 when it is fully inserted. As a result, fumes produced during soldering processes performed with the soldering iron cannot flow into the connector assembly 7 where they could corrode the connectors. Additionally, the O-ring also serves to assist in retaining the cartridge within the handle and provides additional lateral support to the cartridge 4. Additionally, in the illustrated embodiment, a sleeve 16 is mounted on the exterior of the cartridge 10 body for orienting and supporting the cartridge 4 relative to the soldering iron handpiece 3 by engagement thereof with inner surface areas of said passage.

The construction of the soldering iron 1 and cartridge 4, and the manner in which the cartridge 4 is replaceably mounted in the handpiece 3, as described so far, corresponds to that of commonly owned, co-pending U.S. patent application Ser. No. 09/972,194, which is hereby incorporated by reference. However, the nature of the cartridge body, construction of the heating element, electrical connectors, handpiece and manner of mounting of the cartridge in the handpiece, by themselves, form no part of this invention and can be of any type and arrangement known in the art; see, e.g., U.S. Pat. Nos. 4,839,501 and 6,054,678.

On the other hand, whereas the tip end part 14 constitutes the soldering tip in the soldering irons of the prior art, such is not the case in accordance with the present invention. Instead, the tip end part 14 in accordance with the present invention is designed to give the heater cartridge a replaceable tip capacity. Preferably, the tip end part 14 is formed of a material of high thermal conductivity in comparison to a material of which the stainless steel tubular body member 10 of the cartridge body is formed, the material of high thermal conductivity preferably is silver, but the material of high thermal conductivity can be copper or other materials of comparable thermal conductivity. Furthermore, while the tip end part 14 is preferably a separate element fixedly joined to the tubular body member 10 of the cartridge body 4, it can be formed as an integral part thereof.

With reference to FIG. 3, the soldering tip 20 has an expandable open end portion 20a for mounting over the tip end part 14. The expandability of the open end portion 20a of the soldering tip 20 is produced by a plurality axial slots 21 formed in the peripheral wall 20b of the open end portion 20a, only one of which is shown. A securing member in the form of a C-shaped ring clamp 22 (FIG. 4) is seatable on the expandable end portion 20a for restraining expansion thereof, thereby releaseably holding the soldering tip 20 on the tip end part 14. Preferably, as shown, the peripheral wall 20b has a circumferentially extending seating recess 20c formed therein for holding the C-shaped ring clamp 22. However, a snap-ring spring clamp or other securement means could be used instead of the C-shaped ring clamp 22. Alternatively, a separate securing means can be omitted, e.g., if the "legs" formed by the slits 21 are shaped to be placed under a radial pre-stress when mounted on the cartridge 4 by being outwardly deflected in such a mounted state.

With reference to the C-shaped ring clamp 22 of FIG. 4, instead having a circular cross section, clamp 22 can have flat, band-shaped cross section. In such a case, the seating recess 20c can be omitted. Additionally, because of its proximity to the heater, the claim 22 is preferably made of a high temperature resistant material, such as Inconel®.

In the embodiment of FIGS. 1 & 2, the peripheral wall of the tip end part 14 has the same outer diameter as the outer diameter of the tubular body member 10, except where it is reduced for insertion into the tubular body member 10. The soldering tip 20 has a cylindrical receiving chamber 20d with a conic bottom wall, and the tip end part has a cylindrical peripheral wall and conic end face matched to the size and shape of the receiving chamber for providing a removable slip-on fit with optimized heat transfer communication between the soldering tip and tip end part.

In contrast, soldering tip 20 has an inner diameter in the embodiments of FIGS. 5 & 6, the peripheral wall of the soldering tip 20', 20" have substantially the same outer diameter as the outer diameter of the tubular body member 10 and seat on a portion of a tip end part 14', 14" that has an outer diameter that is reduced relative to outer diameter of the tubular body member 10 by the thickness of the peripheral wall surrounding the receiving chamber. In the FIG. 5 embodiment, to releaseably hold the tip 20' on the tip end part 14', a ring 25 is mounted in an annular seat recess of the peripheral wall of the receiving chamber. The ring 25 has an inner diameter that is smaller than the outer diameter of portion of the tip end part 14' on which mounts so that, insertion of the tip end part 14' into the receiving chamber stretches the ring, which can be a C-shaped ring clamp similar to clamp 22 or an annular coil spring or the like, radially outwardly to an extent creating sufficient spring force to hold the tip in place, but still allowing removal of the tip 20'.

In the case of the FIG. 6 embodiment, a compressible ring, detent member 28 is located in an annular seat recess 14" a surrounding the reduced diameter portion of the tip end part 10" on which tip 20" is mounted. The soldering tip 20" has an annular seating groove 20"c which communicates with a pair of radial tool holes 20"e that are located 180° apart. As the soldering tip 20" is slid onto the tip end part, the ring detent member 28 is compressed into the seat recess 14"a. Once the tip is properly seated, the seating groove 20"c is axially aligned with the recess 14"a and the ring detent member 28 expands radially outward into the seating groove 20"c, holding the soldering tip 20" in place. To remove the soldering tip 20", ends of a forceps-like tool T is inserted into the tool holes 20"e and is used to compress the ring detent member 28 sufficiently to become disengaged from the seating groove and to pull the soldering tip 20" forward.

In FIG. 7, yet another means for releaseably mounting the soldering tip on the tip end part is shown. In this case, the soldering tip 20''' has the female slot part 29 of a bayonet type lock and the tip end part carries the male pin part 20 of the bayonet type lock.

FIGS. 8 & 9 show a soldering tip 20'''' that is designed for use with either a hose type clamp or a spring clip. In this embodiment, open end 20''''a has a noncircular transverse cross-sectional shape as is shown in FIG. 9. As can be seen, a pair of lobes 35 are formed 180° apart and have slots 35a formed therein. A spring clip 40 can be slid in the direction of the arrow in FIG. 9, through slots 35 onto tip end part so as to hold the tip 20'''' in place. Alternatively, a hose type clamp can be expanded and slid axially over the tip and then released to engage tip end part via the slots 35; see, FIG. 11.

As shown in FIG. 10, the tip end part 14'''' can have a rounded end instead of the drill point shape shown in FIGS. 1 & 2, which is particularly useful when the tip end part is formed of a silver casting or a sintered silver body. Furthermore, tip end part 14'''' can have a maximum outer diameter that is smaller than an outer diameter of said tubular body member and can be force-fit mounted in an open end of the body member 10. As represented in broken lines in FIG. 8, for use with such a tip end part 14'''', the receiving chamber 20''''d of the soldering tip is given a rounded shape matched to it.

As should be apparent from the foregoing, numerous different arrangements can be utilized to implement the inventive concept, so that the present invention is not intended to be limited to only the specific embodiments shown, but rather is intended to include all variations and modifications encompassed by the scope of the appended claims. For example, the soldering tip could have an internal threading and the tip end part a matching external threading instead of using clips or detents to hold the soldering tip on the tip end part of the cartridge.

We claim:

1. A soldering tip and a tip heater cartridge with a replaceable tip capacity, comprising:

an elongated cartridge body, said cartridge body having a tubular body member and electrical connectors at a first end of the tubular body member for plug-in connection with an electrical connector assembly of a soldering iron handpiece in use;

a soldering tip for mounting on the cartridge body; and a heater mounted within the cartridge body, said heater being electrically connected to said electrical connectors;

wherein a tip end part is located at a second end of the tubular body member that is opposite said first end, wherein said heater is located within said tip end part; and wherein said soldering tip is replaceably mountable over said tip end part in heat exchange contact with said tip end part; wherein said tip end part is formed of a material of high thermal conductivity in comparison to a material of which the tubular body member of the cartridge body is formed; and wherein the material of high thermal conductivity is silver.

2. The soldering tip and tip heater cartridge according to claim 1, wherein the tip end part is a separate element fixedly joined to the tubular body member of said cartridge body.

3. The soldering tip and tip heater cartridge according to claim 1, wherein the tip end part is a separate element fixedly joined to the tubular body member of said cartridge body.

4. The soldering tip and tip heater cartridge according to claim 3, wherein said soldering tip has an expandable open end portion for mounting over the tip end part.

5. The soldering tip and tip heater cartridge according to claim 4, wherein a securing member is seatable on the expandable end portion for restraining expansion of the open end portion for releasably holding the soldering tip on the tip end part.

6. The soldering tip and tip beater cartridge according to claim 4, wherein expandability of said open end portion is provided by axial slits in a peripheral wall of the open end portion.

7. The soldering tip and tip heater cartridge according to claim 6, wherein said securing member is a ring clamp.

8. A soldering tip and tip heater cartridge with a replaceable tip capacity, comprising:
an elongated cartridge body, said cartridge body having a tubular body member and electrical connectors at a first end of the tubular body member for plug-in connection with an electrical connector assembly of a soldering iron handpiece in use;
a soldering tip for mounting on the cartridge body; and
a heater mounted within the cartridge body, said heater being electrically connected to said electrical connectors;
wherein a tip end part is located at a second end of the tubular body member that is opposite said first end, wherein said heater is located within said tip end part; and wherein said soldering tip is replaceably mountable over said tip end part in heat exchange contact with said tip end part; wherein the tip end part is a separate element fixedly joined to the tubular body member of said cartridge body; wherein said soldering tip has an expandable open end portion for mounting over the tip end part; wherein expandability of said open end portion is provided by axial slits in a peripheral wall of the open end portion and wherein said peripheral wall is provided with a circumferentially extending seat for receiving the ring clamp.

9. The soldering tip and tip heater cartridge according to claim 5, wherein said ring clamp is a C-clamp.

10. The soldering tip and tip heater cartridge according to claim 8, wherein said circumferentially extending seat is formed by a groove in said peripheral wall.

11. A soldering tip and tip heater cartridge with a replaceable tip capacity, comprising:
an elongated cartridge body, said cartridge body having a tubular body member and electrical connectors at a first end of the tubular body member for plug-in connection with an electrical connector assembly of a soldering iron handpiece in use;
a soldering tip for mounting on the cartridge body; and
a heater mounted within the cartridge body, said heater being electrically connected to said electrical connectors;
wherein a tip end part is located at a second end of the tubular body member that is opposite said first end, wherein said heater is located within said tip end part; and wherein said soldering tip is replaceably mountable over said tip end part in heat exchange contact with said tip end part; wherein the tip end part is a separate element fixedly joined to the tubular body member of said cartridge body; wherein said soldering tip has an expandable open end portion for mounting over the tip end part; wherein a securing member is seatable on the expandable end portion for restraining expansion of the open end portion for releasably holding the soldering tip on the tip end part; and wherein said securing member is a snap-ring spring clamp.

12. The soldering tip and tip heater cartridge according to claim 2, wherein said the tip end part is formed of one of a silver casting and a sintered silver body.

13. The soldering tip and tip heater cartridge according to claim 12, wherein said soldering tip has a portion with a noncircular transverse cross-sectional shape having a pair of lobes with slots extending crosswise to a longitudinal axis of the tip for receiving one of a spring clip and a hose clamp.

14. A soldering tip and tip heater cartridge with a replaceable tip capacity, comprising:
an elongated cartridge body, said cartridge body having a tubular body member and electrical connectors at a first end of the tubular body member for plug-in connection with an electrical connector assembly of a soldering iron handpiece in use;
a soldering tip for mounting on the cartridge body; and
a heater mounted within the cartridge body, said heater being electrically connected to said electrical connectors;
wherein a tip end part is located at a second end of the tubular body member that is opposite said first end, wherein said heater is located within said tip end part; and wherein said soldering tip is replaceably mountable over said tip end part in heat exchange contact with said tip end part; and wherein said soldering tip and the tip end part each have part of a bayonet lock for releasably holding the soldering tip on the tip end part.

15. The soldering tip and tip heater cartridge according to claim 1, wherein said soldering tip has one of a detent member and a receiving slot for the detent member, wherein the tip end part has the other of the part of the detent member and receiving slot for releasably holding the soldering tip on the tip end part, and further comprising a detent disengaging tool for releasing engagement of the detent member in the receiving slot.

16. The soldering tip and tip heater cartridge according to claim 15, wherein the receiving slot is formed in the soldering tip, and the detent member is a compressible ring seated in a circumferential groove in the periphery of the tip end part.

17. The soldering tip and tip heater cartridge according to claim 12, wherein the tip end part has a rounded tip and said soldering tip has an internal shape matching the rounded tip of the tip end part.

18. The soldering tip and tip heater cartridge according to claim 1, wherein said heater is located substantially entirely within said tip end part.

19. The soldering tip and tip heater cartridge according to claim 1, wherein the soldering tip has a cylindrical receiving chamber with a conic bottom wall, and wherein the tip end part has a cylindrical peripheral wall and conic end face matched to the size and shape of the receiving chamber for providing a removable slip-on fit with optimized heat transfer communication between the soldering tip and tip end part.

20. A soldering iron comprising:
a handpiece having an electrical connector assembly therein; and a tip heater cartridge with a replaceable tip capacity, said tip heater cartridge comprising:

an elongated cartridge body, said cartridge body having a tubular body member and electrical connectors at a first end of the tubular body member for plug-in connection with the electrical connector assembly of said handpiece;

a soldering tip for mounting on the cartridge body; and a heater mounted within the cartridge body, said heater being electrically connected to said electrical connectors;

wherein a tip end part is located at a second end of the cartridge body that is opposite said first end; wherein said heater is located within said tip end part; and wherein said soldering tip is replaceably mountable over said tip end part in heat exchange contact with said tip end part; wherein said tip end part is formed of a material of high thermal conductivity in comparison to a material of which the tubular body member of the cartridge body is formed; and wherein the material of high thermal conductivity is silver.

21. The soldering iron according to claim 20, wherein the tip end part is a separate element fixedly joined to the tubular body member of said cartridge body.

22. The soldering iron according to claim 20, wherein the tip end part is a separate element fixedly joined to the tubular body member of said cartridge body.

23. The soldering iron according to claim 20, wherein said soldering tip has an expandable open end portion for mounting over the tip end part.

24. The soldering iron according to claim 23, wherein a securing member is seatable on the expandable end portion for restraining expansion of the open end portion for releasably holding the soldering tip on the tip end part.

25. The soldering iron according to claim 23, wherein expandability of said open end portion is provided by axial slits in a peripheral wall of the open end portion.

26. The soldering iron according to claim 20, wherein the soldering tip has a cylindrical receiving chamber with a conic bottom wall, and wherein the tip end part has a cylindrical peripheral wall and conic end face matched to the size and shape of the receiving chamber and conic bottom wall for providing a removable slip-on fit with optimized heat transfer communication between the soldering tip and tip end part.

27. A soldering iron comprising:

a handpiece having an electrical connector assembly therein; and a tip heater cartridge with a replaceable tip capacity, said tip heater cartridge comprising:

an elongated cartridge body, said cartridge body having a tubular body member and electrical connectors at a first end of the tubular body member for plug-in connection with the electrical connector assembly of said handpiece;

a soldering tip for mounting on the cartridge body; and a heater mounted within the cartridge body, said heater being electrically connected to said electrical connectors;

wherein a tip end part is located at a second end of the cartridge body that is opposite said first end; wherein said heater, is located within said tip end part; and wherein said soldering tip is replaceably mountable over said tip end part in heat exchange contact with said tip end part; wherein the tip end part is a separate element fixedly joined to the tubular body member of said cartridge body; wherein said soldering tip has an expandable open end portion for mounting over the tip end part; wherein expandability of said open end portion is provided by axial slits in a peripheral wall of the open end portion and wherein said peripheral wall is provided with a circumferentially extending seat for receiving the ring clamp.

28. A soldering iron comprising:

a handpiece having an electrical connector assembly therein; and a tip heater cartridge with a replaceable tip capacity, said tip, heater cartridge comprising:

an elongated cartridge body, said cartridge body having a tubular body member and electrical connectors at a first end of the tubular body member for plug-in connection with the electrical connector assembly of said handpiece;

a soldering tip for mounting on the cartridge body; and a heater mounted within the cartridge body, said heater being electrically connected to said electrical connectors;

wherein a tip end part is located at a second end of the tubular body member that is opposite said first end, wherein said heater is located within said tip end part; and wherein said soldering tip is replaceably mountable over said tip end part in heat exchange contact with said tip end part; and wherein said soldering tip and the tip end part each have part of a bayonet lock for releasably holding the soldering tip on the tip end part.

* * * * *